US008937969B2

(12) United States Patent
Panchal

(10) Patent No.: US 8,937,969 B2
(45) Date of Patent: Jan. 20, 2015

(54) ENHANCED INTER-CELL INTERFERENCE CONTROL

(75) Inventor: Jignesh Panchal, Somerset, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 307 days.

(21) Appl. No.: 13/613,311

(22) Filed: Sep. 13, 2012

(65) Prior Publication Data

US 2014/0071836 A1    Mar. 13, 2014

(51) Int. Cl.
*H04L 12/28* (2006.01)

(52) U.S. Cl.
USPC ............................ 370/431; 370/329; 370/341

(58) Field of Classification Search
USPC ................. 370/329–333, 341, 431, 437, 468
See application file for complete search history.

(56) References Cited

U.S. PATENT DOCUMENTS

| | | | |
|---|---|---|---|
| 8,478,342 B2* | 7/2013 | Vedantham et al. .......... | 455/561 |
| 2005/0141453 A1 | 6/2005 | Zhu | |
| 2008/0279157 A1 | 11/2008 | Cuffaro et al. | |
| 2009/0082002 A1 | 3/2009 | Kim et al. | |
| 2010/0039948 A1 | 2/2010 | Agrawal et al. | |
| 2010/0267408 A1* | 10/2010 | Lee et al. ...................... | 455/509 |
| 2012/0028664 A1 | 2/2012 | Zhang et al. | |
| 2012/0076031 A1 | 3/2012 | Zeira | |
| 2012/0122440 A1* | 5/2012 | Krishnamurthy et al. .... | 455/418 |
| 2012/0134267 A1* | 5/2012 | Noriega et al. ............... | 370/230 |
| 2012/0202540 A1* | 8/2012 | Lee et al. ...................... | 455/501 |
| 2012/0213123 A1* | 8/2012 | Futaki ........................... | 370/254 |
| 2012/0315935 A1* | 12/2012 | Helmersson et al. ......... | 455/501 |
| 2013/0115999 A1* | 5/2013 | Sirotkin et al. ............... | 455/522 |
| 2014/0112254 A1* | 4/2014 | Lindoff et al. ................ | 370/328 |

FOREIGN PATENT DOCUMENTS

| | | |
|---|---|---|
| GB | 2378858 A | 2/2003 |
| WO | WO-2005008933 A2 | 1/2005 |
| WO | WO-2005008933 A3 | 1/2005 |
| WO | WO-2008033369 A2 | 3/2008 |
| WO | WO-2008033369 A3 | 3/2008 |
| WO | WO-2009052754 A1 | 4/2009 |
| WO | WO-2012097433 A1 | 7/2012 |

OTHER PUBLICATIONS

G. Fodor et al., "Intercell Interference Coordination in OFDMA Networks and in the 3GPP Long Term Evolution System", *Journal of Communications*, vol. 4, No. 7, Aug. 2009, pp. 445-453.

(Continued)

*Primary Examiner* — Phuc Tran
(74) *Attorney, Agent, or Firm* — Harness, Dickey & Pierce

(57) ABSTRACT

In an example embodiment, a serving cell is configured to serve a plurality of user equipments (UEs). The serving cell includes a detector, a receiver and a processor. The detector may measure interference on a physical resource block (PRB) at the serving cell. The receiver may receive measurements of interference on the PRB from neighbor cells of the serving cell. The processor may estimate a contribution from each UE of the plurality of UEs to each of the interference measurements received from the neighbor cells, determine for each UE of the plurality of UEs a respective enhanced priority ratio and assign the PRB to one of the plurality of UEs based on the determined enhanced priority ratio. The enhanced priority ratio may be a function of the interference measurement at the serving cell, the interference measurements received from the neighbor cells and the respective estimated contribution of the UE.

20 Claims, 7 Drawing Sheets

(56) References Cited

OTHER PUBLICATIONS

C. Castellanos et al., "Uplink Interference Control in UTRAN LTE Based on the Overload Indicator", 2008.

F. Dominique, et al., "Self-Organizing Interference Management for LTE", In *Bell Labs Technical Journal* (*BLTJ*), 2010.

International Search Report and Written Opinion dated Jan. 15, 2014 for related International Application No. PCT/US2013/058712.

* cited by examiner

ENHANCED INTER-CELL INTERFERENCE CONTROL

BACKGROUND OF THE INVENTION

Embodiments relate to an enhanced method of scheduling Physical Resource Blocks (PRBs) for serving one of a plurality of User Equipments (UEs), a serving cell and/or a wireless cellular network.

Interference

One of the factors limiting the Radio Frequency (RF) coverage of a shared spectrum is co-channel interference. Co-channel interference is a common phenomenon in cellular networks. In Code Division Multiple Access (CDMA) cellular networks like 3GPP2/CDMA2000 and 3GPP/UMTS, the co-channel interference has two components, intra-cell interference and inter-cell interference. In contrast, in Frequency Division Multiple Access (FDMA) based cellular networks like Long Term Evolution (LTE) networks, the uplink (UL) transmission is designed to be orthogonal in the frequency domain between different User Equipments (UEs), thus virtually eliminating the intra-cell interference associated with CDMA. However, LTE UL transmissions are still susceptible to inter-cell interference especially since LTE systems are designed to operate with a frequency reuse factor of one where neighboring cells use the same frequencies. Therefore, in LTE the main constraints on transmission power at different time intervals in a frame (referred to as Physical Resource Blocks (PRBs)) arises from inter-cell interference, making careful management of inter-cell interference particularly important in systems such as LTE.

The UL interference perceived by a cell s is based on interference from the active users u in the neighboring cells s'. Assume that a set of users u using a PRB m in a Transmission Time Interval (TTI) t that contribute to UL interference at a cell s is defined as $\phi_{m,t,s}$. The transmit power of an interfering ue$\phi_{m,t,s}$ for the PRB m in TTI t is $Pt_{m,t,u}$. The received power of the interfering user u at the serving cell s is $Pr_{m,t,u,s} = Pt_{m,t,u} \cdot \rho_{m,t,u,s}$, where $\rho_{m,t,u,s}$ is the link gain on the PRB m in TTI t from the interfering user u to the serving cell s. By summing the received power from all interfering users u from the set $\phi_{m,t,s}$, the total interfering power on the PRB m in TTI t, as perceived by the serving cell s is given by:

$$I_{m,t,s} = \sum_{u \in \phi_{m,t,s}} Pr_{m,t,u,s} \quad (1)$$

In LTE, the interference is measured by the performance metric called interference over thermal noise (IoT). Thus, the IoT on the PRB m in TTI t at the serving cell s is:

$$IoT_{m,t,s} = \frac{I_{m,t,s} + \bar{\eta}_s}{\bar{\eta}_s} \quad (2)$$

where $\bar{\eta}_s$ is an averaged long-term noise floor on serving cell s over a 180 KHz wide PRB. The log domain number is expected to be around −118 dBm, assuming a −174 dBm/Hz thermal noise density, minus a 4 dB noise figure of the receiver.

If another user u having a different serving cell s is assigned the same PRB m in TTI t by its own serving cell s, the achieved UL signal to interference plus noise ratio (SINR) of the active user u on the PRB m in TTI t at the cell s is:

$$\gamma_{m,t,u,s} = \frac{Pr_{m,t,u,s}}{I_{m,t,s} + \bar{\eta}_s} \quad (3)$$

In equation 3, $I_{m,t}(s)$ represents the interference power on the PRB m in TTI t at the cell s, contributed by all interfering users from the set $\phi_{m,t,s}$. Plugging equation (2) into equation (3), results in:

$$\gamma_{m,t,u,s} = \frac{Pr_{t,s,u,s}}{IoT_{m,t,s} \cdot \bar{\eta}_s} \quad (4)$$

Note that, for simplicity, it is assumed that the serving cell s perceives that all UEs, including interfering UEs and UEs within the serving cell, are in time alignment.

A time averaged per-PRB IoT can be calculated using a single pole IIR filter as:

$$\overline{IoT}_{m,t,s} = (1-\beta) \cdot \overline{IoT}_{m,t-1,s} + \beta \cdot IoT_{m,t}(s), \quad (5)$$

where $\beta$ is a filter coefficient.

Scheduling

An enhanced nodeB (eNodeB) in an LTE system is responsible for managing resource scheduling for both uplink and downlink channels. The goal of a resource scheduling algorithm is to optimize allocation of PRBs. UEs are assigned to the PRB based on which UE has the highest priority ratio $r_{m,t,u,s}/(\tilde{R}_{t,u,s})^\alpha$, where $\tilde{R}_{t,u,v}$ is long-term averaged throughput, $r_{m,t,u,s}$ is instantaneous spectral efficiency and a is a variable used to tune the "fairness" of the scheduler. The average throughput $\tilde{R}_{t,u,v}$ on TTI t is computed using the following single-pole IIR filter:

$$\tilde{R}_{t,u,s} = (1-\beta) \cdot \tilde{R}_{t-1,u,s} + \beta \cdot R_{t-1,u,s} \quad (6)$$

A scheduler at the serving cell s is configured to assign the PRB m at TTI t to a UE u with the highest determined priority ratio.

In general, there are two types of scheduling algorithms used to determine the priority ratio, opportunistic scheduling and fair scheduling. Fair scheduling focuses on achieving at least a minimum data rate for each UE by setting $\alpha=1$ for all UEs, while opportunistic scheduling focuses on achieving at least a maximum total data rate among all the UEs serviced by setting $\alpha<1$ for UEs that have a relatively low throughput.

Limiting Interference

Conventionally, to reduce and maintain the IoT level, several techniques are used including well-known static frequency reuse, limiting maximum transmit power and dynamic techniques that are specific to a LTE/OFDMA system, such as soft fractional frequency reuse (SFFR) and inter-cell interference coordination (ICIC). Inter-cell Interference Control (ICIC) is used to manage IoT in LTE systems for UL transmissions. ICIC scheduling algorithms make use of measurement information to make an informative scheduling decision to limit inter-cell interference. In order to coordinate scheduling in different cells, communication between neighboring cells is required.

Conventional ICIC methods utilize two messages exchanged between eNodeBs over an X2 interface to facilitate coordination of their transmit powers and scheduling of UEs, namely an exchange of an Overload Indicator (OI) and a High Interference Indicator (HII). The OI may be sent from neighboring cells on the X2 interface, as an indication of the average uplink IoT for each PRB at the respective neighboring cell. The OI can take three values, expressing low, medium, and high levels of IoT. The HIT may be sent from the serving cell to the neighbor cell on the X2 interface to indicate that the serving cell will be scheduling uplink transmissions for a cell-edge UE in certain PRBs, and therefore that interference may be high in those frequency regions. The HII is an active message that does not depend on a measurement. Serving cells that receive the OI and HII indicators may then take this information into consideration in scheduling their own UEs to limit the interference impact.

In one or more example embodiments, instead of exchanging merely OI and HII indicators to make informative scheduling decisions, a serving cell may attempt to minimize a cost associated with assigning the PRB to one of the plurality of UEs by determining an enhanced priority ratio. The enhanced priority ratio is determined by exchanging IoT measurements with eNBs in neighboring cells and utilizing these exchanged measurements along with other information to make per-PRB scheduling decisions to control or limit the interference.

The periodicity of the exchanges between eNBs is a configurable parameter and can range from a millisecond timescale (msec) to timescales on the order of minutes (min). Each serving cell s can identify its respective neighboring cells s' using a 3GPP proposed Self-Optimizing Network (SON) algorithm, such as an Automatic Neighbor Relation (ANR) algorithm. Alternatively, the serving cell s can identify its respective neighbor cells s' manually based on field or empirical measurements.

SUMMARY OF THE INVENTION

At least one example embodiment relates to a method of scheduling a physical resource block (PRB) for serving one of a plurality of user equipments (UEs).

In one embodiment, the method includes measuring interference on the PRB at a serving cell, the serving cell configured to serve the plurality of UEs and receiving measurements of interference on the PRB from neighbor cells of the serving cell; and estimating a contribution from each UE of the plurality of UEs to each of the neighbor-cell interference measurements. The method further includes determining for each UE of the plurality of UEs a respective enhanced priority ratio and assigning the PRB to one of the plurality of UEs based on the determined enhanced priority ratios. The enhanced priority ratio is a function of the interference measurement at the serving cell, the interference measurements received from the neighbor cells and the respective estimated contribution of the UE.

In one example embodiment, the method includes transmitting the interference measurement at the serving cell to the neighbor cells.

In one example embodiment, the interference measurements received from the neighbor cells are a time averaged measurement of interference on the PRB at the neighbor cells.

In one example embodiment, the method includes receiving, at the serving cell, transmit power and noise floor measurements from the neighbor cells. The method further includes, receiving, at the serving cell, received power measurements from the plurality of UEs. The estimating estimates the contribution of each of the plurality of UEs using the transmit power and noise floor measurements from the neighbor cells and the respective received power measurements from the UE.

In one example embodiment, for each UE of the plurality of UEs, the received power measurements include a power measurement of a signal received from the serving cell and power measurements of signals received from the neighbor cells.

In one example embodiment, the method includes determining a target signal to interference plus noise ratio (SINR); determining, for each UE of the plurality of UEs, a respective serving pathloss between the serving cell and the respective UE; determining, for each UE of the plurality of UEs, neighbor pathlosses between respective UE and each of the neighbor cells; and determining, for each UE of the plurality of UEs, pathloss differences between the respective determined serving pathloss and each of the respective determined neighbor pathlosses. The method further includes, estimating the contribution from each UE of the plurality of UEs to the neighbor-cell interference measurements using the respective determined pathloss differences for the UE, the received noise floor measurements and the determined target SINR In one example embodiment, the interference measurement at the serving cell and the interference measurements from the neighbor cells are measurements of interference over thermal noise (IoT) on the PRB.

At least one example embodiment relates to a serving cell configured to serve a plurality of user equipments (UEs).

In one example embodiment, the serving cell includes a detector, a receiver and a processor. The detector may be configured to measure interference on a physical resource block (PRB) at the serving cell. The receiver may be configured to receive measurements of interference on the PRB from neighbor cells of the serving cell. The processor may be configured to estimate a contribution from each UE of the plurality of UEs to each of the interference measurements received from the neighbor cells, determine for each UE of the plurality of UEs a respective enhanced priority ratio. The enhanced priority ratio may be a function of the interference measurement at the serving cell, the interference measurements received from the neighbor cells and the respective estimated contribution of the UE. The processor may further be configured to assign the PRB to one of the plurality of UEs based on the determined enhanced priority ratio.

In one example embodiment, the serving cell includes a transmitter configured to transmit the interference measurement at the serving cell on the PRB to the neighbor cells.

In one example embodiment, the interference measurements received from the neighbor cells are a time averaged measurement of interference on the PRB at the neighbor cells.

In one example embodiment, the receiver is further configured to receive transmit power and noise floor measurements from the neighbor cells and receive received power measurements from the plurality of user. The processor is further configured to estimate the estimated contributions using the transmit power and noise floor measurements from the neighbor cells and the respective received power measurements from the UE.

In one example embodiment, for each UE of the plurality of UEs, the received power measurements include a power measurement of a signal received from the serving cell and power measurements of signals received from the neighbor cells.

In one example embodiment, the interference measurement at the serving cell and the interference measurements received from the neighbor cells are measurements of interference over thermal noise (IoT) on the PRB.

At least one example embodiment relates to a wireless cellular network.

In one example embodiment, the wireless cellular network may include a serving cell and neighbor cells of the serving cell. The neighbor cells may be configured to provide, to the serving cell, a measurement of interference on a physical resource block (PRB) at the neighbor cells. The serving cell may be configured to serve a plurality of user equipments (UEs). The serving cell may include a detector configured to measure the interference on the PRB at the serving cell and a processor. The processor may be configured to estimate a contribution from each UE of the plurality of UEs to each of the neighbor-cell interference measurements; and determine for each UE of the plurality of UEs a respective enhanced priority ratio. The enhanced priority ratio may be a function of the interference measurement at the serving cell, the interference measurements received from the neighbor cells and the respective estimated contribution of the UE. The processor may further be configured to assign the PRB to one of the plurality of UEs based on the determined enhanced priority ratios.

In one example embodiment, the serving cell further includes a transmitter configured to transmit the interference measurement at the serving cell on the PRB to the neighbor cells.

In one example embodiment, the interference measurements received from the neighbor cells are a time averaged measurement of interference on the PRB at the neighbor cells.

In one example embodiment, the serving cell further includes a receiver configured to receive transmit power and noise floor measurements from the neighbor cells and received power measurements from the plurality of UEs. The processor is further configured to estimate the estimated contributions using the transmit power and noise floor measurements from the neighbor cells and the respective received power measurements from the UE.

In one example embodiment, for each UE of the plurality of UEs, the received power measurements include a power measurement of a signal received from the serving cell and power measurements of signals received from the neighbor cells.

In one example embodiment, the processor is further configured to determine a target signal to interference plus noise ratio (SINR); determine, for each UE of the plurality of UEs, a respective serving pathloss between the serving cell and the respective UE; determine, for each UE of the plurality of UEs, neighbor pathlosses between respective UE and each of the neighbor cells; and determine, for each UE of the plurality of UEs, pathloss differences between the respective determined serving pathloss and each of the respective determined neighbor pathlosses. The processor is further configured to estimate the contribution from each UE of the plurality of UEs to the neighbor-cell interference measurements using the respective determined pathloss differences for the UE, the received noise floor measurements and the determined target SINR.

In one example embodiment, the interference measurement at the serving cell and the interference measurements received from the neighbor cells are measurements of interference over thermal noise (IoT) on the PRB.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
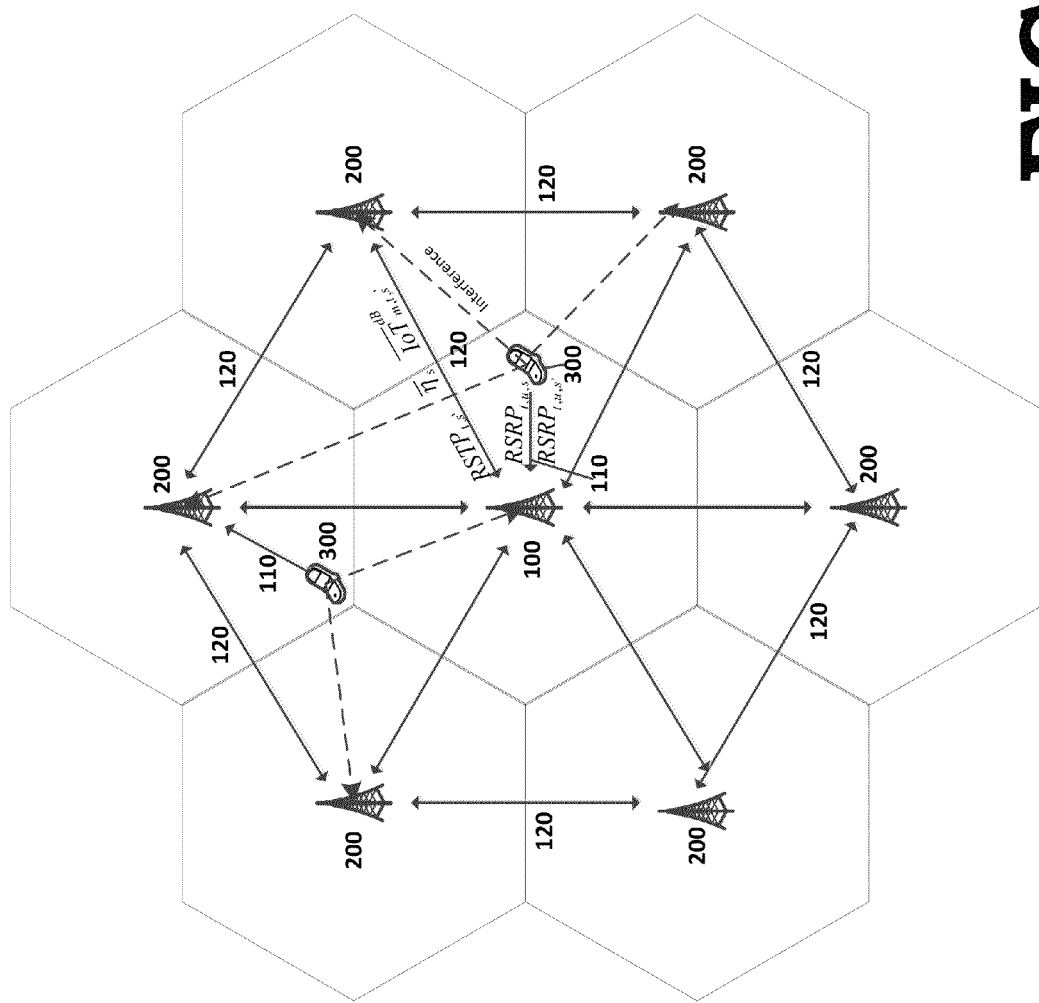
FIG. 1 illustrates a wireless cellular network according to an example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the testis "comprises", "comprising", "includes" and/or "including", when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing", "computing", "calculating", "determining", "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "Enhanced NodeB" or "eNodeB" may be understood as a one or more cell sites, base stations, nodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example. A "cell" may be understood to be a more general term that encompasses both a "cell" which transmits equally in all directions (omni-directional) and a "sector" which transmits in a given direction (directional).

Communication from the eNodeB to the UE is typically called downlink or forward link communication. Communication from the UE to the eNodeB is typically called uplink or reverse link communication.

Note also that the software implemented aspects of the example embodiments are typically encoded on some of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 1 illustrates a wireless cellular network according to an example embodiment.

Referring to FIG. 1, a network 10 includes cells 100/200 and a plurality of UEs 300. The cells 100/200 may be base stations, for example, enhanced Node-Bs (eNodeBs or eNBs). The cells 100/200 may serve a geographic area known as a cell or sector. Each cell may have a plurality of UEs 300.

From the view point of a particular UE 300, the cells 100/200 are divided into a serving cell 100 and neighbor cells 200. The serving cell 100 is the cell that is currently serving the UE 300 located within its cell, while the neighbor cells 200 are the cells surrounding the serving cell 100.

In LTE systems, an uplink connection between the serving cell 100 and each of the plurality of UEs 300 within the serving cell 100 is frequency division multiplexed with different UEs 300 being allocated time-frequency blocks known as physical resource blocks (PRBs). In the example embodiment shown in FIG. 1, the serving cell 100 schedules UEs 300 within its cell to transmit data on different PRBs at a TTI t. User data may be transmitted on a Physical Uplink Shared Channel (PUSCh), while feedback and control information may be transmitted on a Physical Uplink Control Channel (PUCCh). Feedback and control information may include, for example, downlink transmission acknowledgments and downlink channel quality feedback.

UEs 300 may communicate with their respective serving cell 100 via pairs of bi-directional uplink/downlink communication links 110. Likewise, cells 100/200 may communicate with each other over backhaul connections 120. For instance, the cells 100/200 may communicate with each other over X2 communication interfaces.

In LTE systems, there may be full re-use of resources across cells, such that a same PRB may be used in both a serving cell 100 and a neighbor cell 200. Therefore, a UE 300 operating on a PRB in a serving cell 100 may cause interference on a neighbor cell 200 that is utilizing the same PRB at the same TTI t.

In one or more example embodiments, ICIC is used by a serving cell 100 to make interference-aware scheduling of a PRB to a UE 300 at a TTI t through calculating and evaluating an enhanced priority ratio for assignable UEs 300 within the serving cell 100 according to at least the methods shown with respect to FIGS. 4-6, described below.

Figure 2:
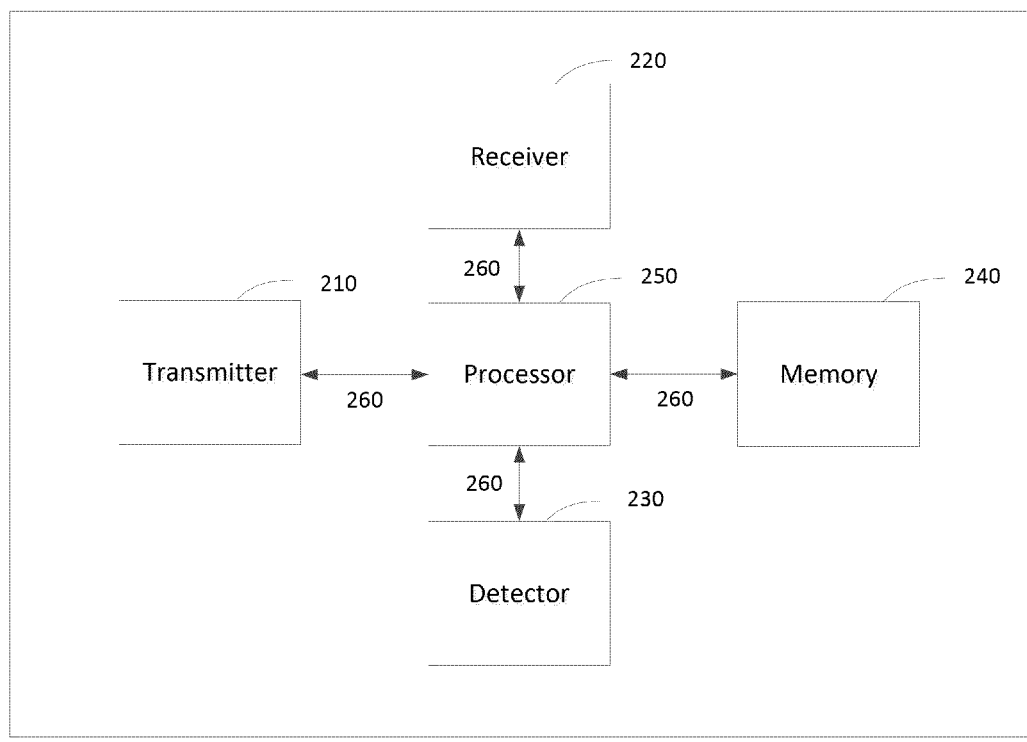
FIG. 2 illustrates a serving cell according to an example embodiment.

FIG. 2 illustrates an example embodiment of a cell 100/200 representing a configuration of both a serving cell 100 and a neighbor cell 200. The cell 100/200 may include one or more eNBs. It should be also understood that each cell 100/200 may include features not shown in FIG. 2 and should not be limited to those features that are shown.

Referring to FIG. 2, each of the cells 100/200 may include for example, a transmitter 210, a receiver 220, a detector 230, a memory 240, and a processor 250 that may communicate with each other over a data bus 260.

The transmitter 210 is a device that includes hardware and any necessary software for transmitting wireless signals including, for example, data signals, control signals, and signal strength or quality information via one or more wireless connections to other network elements in the wireless communications network 100.

The receiver 220 is a device that includes hardware and any necessary software for receiving wireless signals including, for example, data signals, control signals, and signal strength or quality information via one or more wireless connections to other network elements in the network 100.

The detector 230 is a device that includes hardware and any necessary software for measuring IoT at the cell 100/200 on a PRB. However, the detector 230 may be embodied as part of the receiver 220.

The memory 240 may be any device capable of storing data including magnetic storage, flash storage, etc.

The processor 250 may be any device capable of processing data including, for example, a microprocessor configured to carry out specific operations based on input data, or capable of executing instructions included in computer readable code. The computer readable code may be stored on, for example, the memory unit 256.

For example, the processor 250 may be configured to determine an enhanced priority ratio for the UEs 300 within the serving cell 100 and assign a PRB to one of the UEs 300 within the serving cell 100 based on the determined enhanced priority ratios according to at least the methods shown with respect to FIGS. 4-6, described below.

Figure 3:
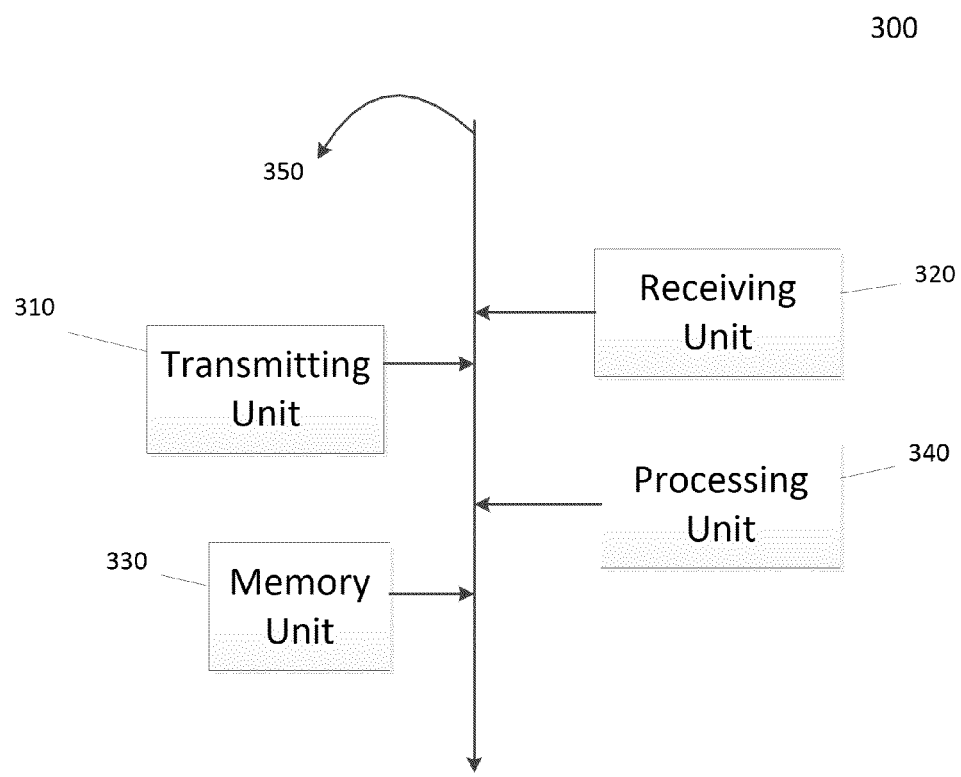
FIG. 3 illustrates a block diagram of a UE according to an example embodiment.

FIG. 3 illustrates an example embodiment of UE 300. It should be also understood that the UE 300 may include features not shown in FIG. 3 and should not be limited to those features that are shown.

Referring to FIG. 3, the UE 300 may include, for example, a data bus 350, a transmitting unit 310, a receiving unit 320, a memory unit 330, and a processing unit 340.

The transmitting unit 310, receiving unit 320, memory unit 330, and processing unit 340 may send data to and/or receive data from one another using the data bus 350.

The transmitting unit 310 is a device that includes hardware and any necessary software for transmitting wireless signals including, for example, data signals, control signals, and signal strength/quality information via one or more wireless connections to other network elements in the wireless communications network 100.

The receiving unit 320 is a device that includes hardware and any necessary software for receiving wireless signals including, for example, data signals, control signals, and signal strength/quality information via one or more wireless connections to other network elements.

The memory unit 330 may be any device capable of storing data including magnetic storage, flash storage, etc.

The processing unit 340 may be any device capable of processing data including, for example, a microprocessor configured to carry out specific operations based on input data, or capable of executing instructions included in computer readable code. The computer readable code may be stored on, for example, the memory unit 330.

For example, the processing unit 340 is capable of determining Reference Signal Transmit Power (RSTP) measurements using the receiving unit 320 for each cell (eNB) that are within a communication range of the UE 300. The processing unit 340 is also configured to transmit the RSTP measurements to its serving cell (eNB) using the transmitting unit 310.

Figure 4:
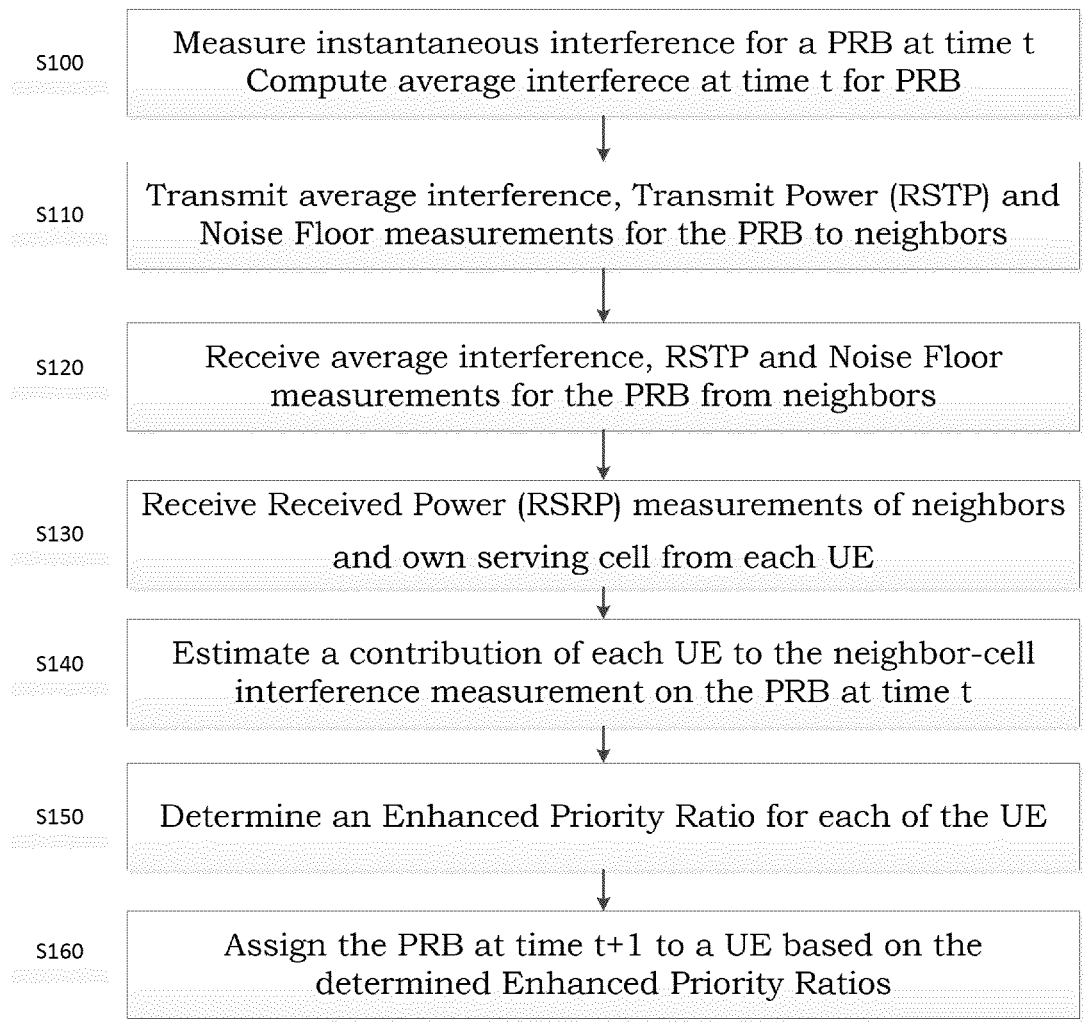
FIG. 4 illustrates a method of scheduling a PRB for serving one of a plurality of UEs according to an example embodiment.

FIG. 4 illustrates an example embodiment of a method of scheduling a PRB for serving one of a plurality of UEs. The method shown in FIG. 4 may be performed by the serving cell 100 shown in FIGS. 1 and 2.

FIG. 4 will be described with respect to serving cell 100, but it will be understood that each of the neighbor cells 200 may perform the same operations with respect to scheduling physical resource blocks (PRBs) to UEs 300 located within their respective cells.

Referring to FIGS. 2-4, at step S100 in FIG. 4, the serving cell 100 measures an instantaneous IoT for a PRB at time t using the detector 230, and the serving cell 100 computes an average IoT at time t for the PRB using the processor 250.

The serving cell 100 may transmit the average IoT measurements, Transmit Power (RSTP) measurements and noise floor measurements to each of its neighbor cells 200 at step S110. Likewise, at step S120, the serving cell 100 may receive average IoT, RSTP and noise floor measurements for the PRB from neighbor cells 200. For instance, the measurements may be exchanged between cells 100/200 over communications interface 120.

At step S130, the serving cell 100 receives, from each UE 300 within the cell, received power (RSRP) measurements recorded at the respective UE 300 for the neighbor cells 200 and the serving cell 100. For instance, the UE 300 may send the RSRP measurements to the serving cell 100 over communication link 110.

At step S140, the serving cell 100 may estimate, using the processor 250, the contribution of each of UE 300 to the IoT measurements that were received from the neighbor cells 200 in step S120. As discussed in more detail below with respect to FIG. 5, the contribution of a UE 300 may be calculated using the RSRP measurements received from the respective UE 300 in step S130 and the average IoT, the RSTP and the noise floor measurements received from the neighbor cells 200 in step S120.

The serving cell 100 may determine for each UE 300 an associated enhanced priority ratio in step S150. As discussed in more detail below with respect to FIG. 6, the enhanced priority ratio may be a function of the IOT measurement at the serving cell as determined in step S100, the IOT measurements received from the neighbor cells 200 in step S120 and the estimated contribution of the associated UE to the received IoT measurements, as determined in step S140.

In step S160, the serving cell 100 may assign the PRB to one of the UEs 300 based on the enhanced priority ratios for each of the UEs 300, as determined in step S150.

Figure 5:
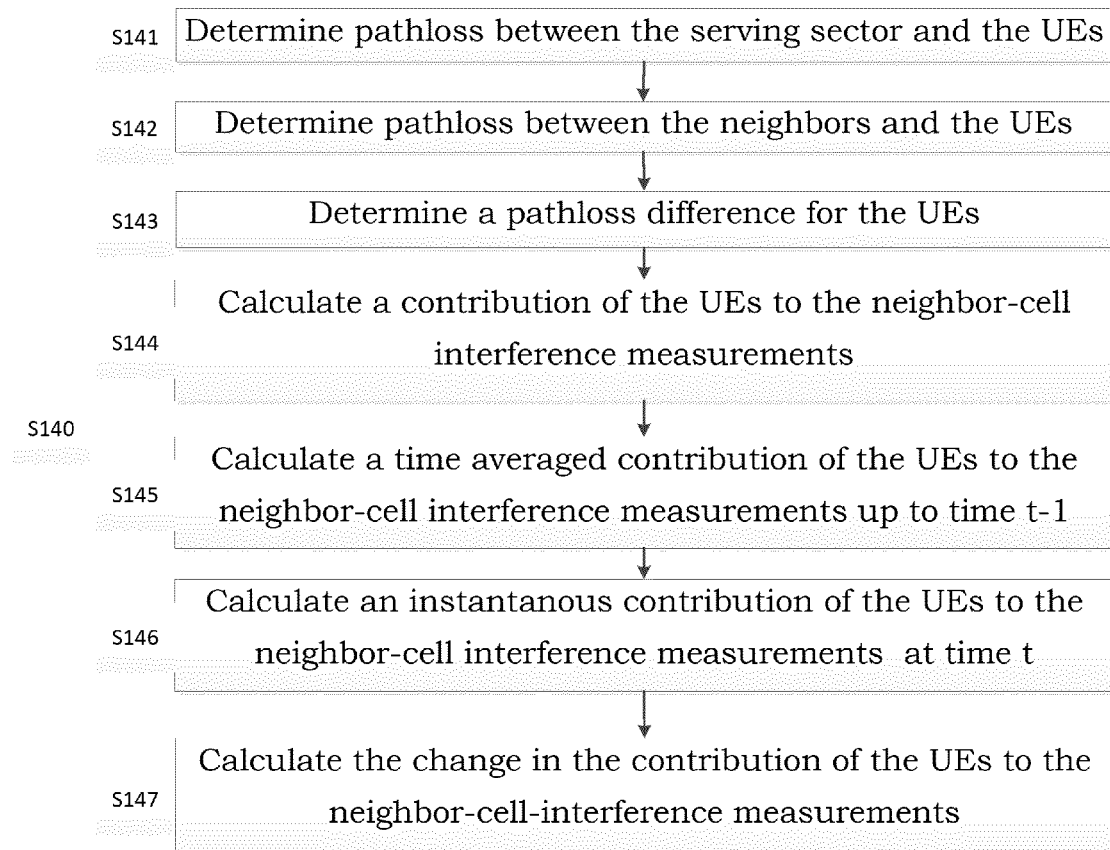
FIG. 5 illustrates a method of estimating a UE's contribution to neighbor cell's IoT measurement on a PRB at a time t according to an example embodiment.

FIG. 5 illustrates an example embodiment of a method of determining the contribution of a UE 300 to IoT measurements received from neighbor cells 200 as discussed in step S140 of FIG. 4.

In the equations that follow, "s" refers to the serving cell 100, "s'" refers to the neighbor cells 200, "$\psi_s$'" refers to a set containing all of the neighbor cells 200, "u" refers to UE 300, "m" refers to the PRB being assigned, "t" refers to the TTI in which the PRB is being assigned and "t−1" refers to the previous TTI.

Referring to FIG. 5, in step S141, the serving cell 100 determines a pathloss between the serving cell 100 and the UE 300.

In more detail, typically, pathloss is equal to transmit power of a reference or pilot signal minus a received power of the reference or pilot signal. Therefore, the serving cell 100 may utilize its own Reference Signal Transmit Power (RSTP) and a Reference Signal Received Power (RSRP) measurement as measured at the UE to determine a pathloss between the serving cell 100 and the UE 300. For example, the pathloss between the serving cell 100 and the UE 300 may follow the equation:

$$\lambda_{t,u,s'}^{dB} = RSRP_{t,u,s} - RSTP_{t,s} \quad (7)$$

In step S142, the serving cell 100 determines a pathloss between the neighbor cells 200 and the UE 300. In more detail, the pathloss between a neighbor cell 200 and the UE 300 may follow the equation:

$$\lambda_{t,u,s'}^{dB} = RSRP_{t,u,s'} - RSTP_{t,s'} \quad (8)$$

In step S143, the serving cell 100 determines a pathloss difference for the UE 300, the pathloss difference being a difference between the pathloss determined in step S142 and the pathloss determined in step S141. In more detail, once the pathloss between serving cell 100 and the UE 300 is known and pathloss between neighbor cell 200 and the UE 300 is known, the serving cell 100 may compute the pathloss difference for the UE 300 at TTI t using the following equation:

$$\Delta\lambda_{t,u,s,s'}^{dB} = \lambda_{t,u,s}^{dB} - \lambda_{t,u,s'}^{dB} \lambda_{t,u,s,s'}^{dB} = \lambda_{t,u,s}^{dB} - \lambda_{t,u,s'}^{dB} \quad (9)$$

As shown in the equations 7-9, the pathloss difference $\Delta\lambda_{t,u,s,s'}^{dB}$ may be determined using the RSRP measurements received from the UE 300 and the RSTP measurements received from the neighbor cells 200.

In step S144, the serving cell 100 estimates the contribution of the UE 300 to the IoT measurements that were received from the neighbor cells 200 in step S120. The contribution of the UE 300 may be estimated using the pathloss difference $\Delta\lambda_{t,u,s,s'}^{dB}$ calculated in step S141, the noise floor measurements $\bar{\eta}_s^{dB}$ received from the neighbor cells 200 in step S120, and a target Signal to Interference plus Noise Ratio (SINR) $\hat{\gamma}_{m,t,u,s}^{dB}$ for the UE 300. In the aforesaid estimation the target SINR $\hat{\gamma}_{m,t,u,s}^{dB}$ for the UE 300 may be a design parameter set at the serving cell 100 through empirical study and the pathloss difference is calculated in step S141 using the RSRP measurements received from the UE 300 and RSTP measurements received from the neighbor cells 200.

In more detail, pathloss difference $\Delta\lambda_{t,u,s,s'}^{dB}$ and target SINR $\hat{\gamma}_{m,t,u,s}^{dB}$ are used to estimate the IoT contribution of the UE 300 on PRB m if the UE 300 is assigned to the PRB m at TTI t. Assume that the transmit power of the UE 300 for the PRB m in TTI t is $Pt_{m,t,u}^{dBm}$. Based on pathloss based channel model, received power of the UE 300 at the serving cell 100 is $Pr_{m,t,u,s}^{dBm} = Pt_{m,t,u}^{dBm} - \lambda_{t,u,s}^{dB}$, where $\lambda_{t,u,s}^{dB}$ is the pathloss from the UE 300 to the serving cell 100 at TTI t as calculated in step S141. Assume that the UE 300 would achieve a SINR target such that $\hat{\gamma}_{m,t,u,s}^{dB} = Pr_{m,t,u,s}^{dBm} - \bar{\eta}_s^{dB} = Pt_{m,t,u}^{dBm} - \lambda_{t,u,s}^{dB} - \bar{\eta}_s^{dB}$, where $\bar{\eta}_s^{dB}$ is noise floor on cell s. Further manipulation of the equation leads to the following:

$$\hat{\gamma}_{m,t,u,s}^{dB} = Pt_{m,t,u}^{dBm} - \lambda_{t,u,s}^{dB} - \bar{\eta}_s^{dB}$$

$$\hat{\gamma}_{m,t,u,s}^{dB} + \lambda_{t,u,s}^{dB} = Pt_{m,t,u}^{dBm} - \bar{\eta}_s^{dB} \quad (10)$$

Likewise, based on a pathloss based channel model, received interference power of the UE 300 at neighbor cell 200 is $Pr_{m,t,u,s'}^{dBm} = Pt_{m,t,u}^{dBm} - \lambda_{t,u,s'}^{dB}$, where $\lambda_{t,u,s'}^{dB}$ is pathloss from the UE 300 to the neighbor cell 200 at TTI t, as calculated in step S142.

As show in the equation below, further manipulation shows that $\hat{\gamma}_{m,t,u,s}^{dB} + \Delta\lambda_{t,u,s,s'}^{dB} + \bar{\eta}_s^{dB}$, is the estimated interference power contribution $I_{m,t,u,s'}^{dBm}$ of the UE 300 on the PRB m at neighbor cell 200, if the serving cell 100 assigns the PRB m to the UE 300 at TTI t. That is:

$$\hat{\gamma}_{m,t,u,s}^{dB} = \lambda_{t,u,s}^{dB} - \lambda_{t,u,s'}^{dB} = Pt_{m,t,u}^{dBm} - \lambda_{t,u,s'}^{dB} - \bar{\eta}_s^{dB}$$

$$\hat{\gamma}_{m,t,u,s}^{dB} + \Delta\lambda_{t,u,s,s'}^{dB} = Pr_{m,t,u,s'}^{dBm} - \bar{\eta}_s^{dB}$$

$$\hat{\gamma}_{m,t,u,s}^{dB} + \Delta\lambda_{t,u,s,s'}^{dB} + \bar{\eta}_s^{dB} = I_{m,t,u,s'}^{dBm} \quad (11)$$

where $Pr_{m,t,u,s'}^{dBm} = I_{m,t,u,s'}^{dBm}$ is the user u estimated interference power contribution on PRB m at TTI t at neighbor cell 200. If the PRB m is not assigned to the UE 300 at TTI t, we can assume $$I_{m,t,u,s'} = 10^{I_{m,t,u,s'}^{dBm}/10} = 0.$$

A time averaged interference power of the UE 300 on the PRB m at TTI t−1 at the neighbor cell 200 is calculated using a single pole IIR filter illustrated below, where β is a filter coefficient.

$$\bar{I}_{m,t-1,u,s'} = (1-\beta) \cdot I_{m,t-2,u,s'} + \beta \cdot I_{m,t-1,u,s'} \quad (12)$$

In step S145, using the time averaged interference power $\bar{I}_{m,t-1,u,s'}$, the serving cell 100 can determine the average IoT $\overline{iot}_{m,t-1,u,s'}^{dB}$ contributed by the UE 300 on the PRB m up to TTI t−1 for the neighbor cell 200. For example, the average IoT $\overline{iot}_{m,t-1,u,s'}^{dB}$ may be determined using the following equation:

$$\overline{iot}_{m,t-1,u,s'}^{dB} = 10\log_{10}\left(\frac{\overline{I}_{m,t-1,u,s'} + \overline{\eta}_{s'}}{\overline{\eta}_{s'}}\right) \quad (13)$$

In step S146, the serving cell 100 may determine an instantaneous IoT contribution $iot_{m,t,u,s'}^{dB}$ of the UE 300 on the PRB m at TTI at the neighbor cell 200.

In more detail, using the time averaged interference power $I_{m,t,u,s'}$, the serving cell 100 can estimate the instantaneous IoT contribution $iot_{m,t,u,s'}^{dB}$ of the UE 300 on the PRB m at TTI t at the neighbor cell 200 as per the following equation:

$$iot_{m,t,u,s'}^{dB} = 10\log_{10}\left(\frac{I_{m,t,u,s'} + \overline{\eta}_{s'}}{\overline{\eta}_{s'}}\right) \quad (14)$$

In step S147, a change in the contribution of the UE 300 to the IoT measurements on a PRB at the neighbor cells 200 $\Delta iot_{m,t,u,s'}^{dB}$ is calculated using the average contribution of the UE 300 on the PRB $\overline{iot}_{m,t-1,u,s'}^{dB}$, as determined in step S145, and an instantaneous contribution of the UE 300 on the PRB $iot_{m,t,u,s'}^{dB}$ as determined in step S146.

Using the average contribution $\overline{iot}_{m,t-1,u,s'}^{dB}$ and the instantaneous contribution $iot_{m,t,u,s'}^{dB}$, the serving cell 100 can calculate the change in the contribution of the UE 300 to the IoT measurements on a PRB at the neighbor cells 200 $\Delta iot_{m,t,u,s'}^{dB}$ as per the following equation:

$$\Delta iot_{m,t,u,s'}^{dB} = iot_{m,t,u,s'}^{dB} - \overline{iot}_{m,t-1,u,s'}^{dB} \quad (15)$$

Figure 6:
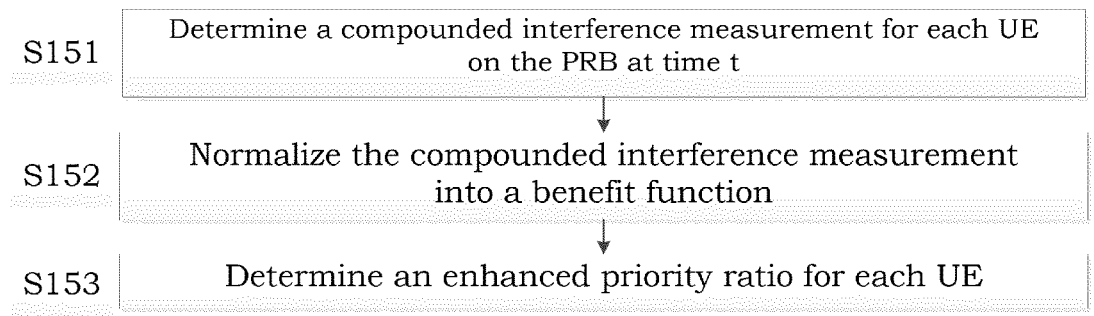
FIG. 6 illustrates a method of calculating the Enhanced Priority Ratio for each of the plurality of UEs according to an example embodiment.

FIG. 6 illustrates an example embodiment of a method of calculating an enhanced priority ratio for the UEs 300 as discussed in step S150 of FIG. 4.

Referring to FIG. 6, in step S151, the serving cell 100 determines a compounded IoT measurement $l_{m,t,u,s}$ on the PRB m at TTI t for each UE 300. The compound IoT measurement may be expressed as:

$$l_{m,t,u,s} = \overline{IoT}_{m,t-1,s}^{dB} + \max_{s' \in \psi_s}\left(\overline{IoT}_{m,t-1,s'}^{dB} + \Delta iot_{m,t,u,s'}^{dB}\right) \quad (16)$$

where $\overline{IoT}_{m,t-1,s}^{dB}$ is the time averaged IoT at the serving cell 100 up to TTI t-1, and $$\max_{s' \in \psi_s}\left(\overline{IoT}_{m,t-1,s'}^{dB} + \Delta iot_{m,t,u,s'}^{dB}\right)$$

is the highest value of the time averaged IOT at the neighbor cells 200 up to Tri t-1, $\overline{IoT}_{m,t-1,s'}^{dB}$, as received from the neighbor cells 200 in step S120, summed with the change in the contribution of the UE 300 to the IoT measurements on a PRB at the respective neighbor cell 200 $\Delta iot_{m,t,u,s'}^{dB}$, as determined in step S146, among all the neighbor cells s'∈ψ$_s$.

In absence of any one or more of these metrics for a particular UE 300 at a particular neighbor cell 200 on a particular PRB m, then $l_{m,t,u,s}$ may be computed by substituting 0 dB for the absent metric.

In step S152, the serving cell 100 may normalize the compounded IoT measurement $l_{m,t,u,s}$, as determined in step S151, into a benefit function $b_{m,t,u,s} = f(l_{m,t,u,s})$.

Figure 7:
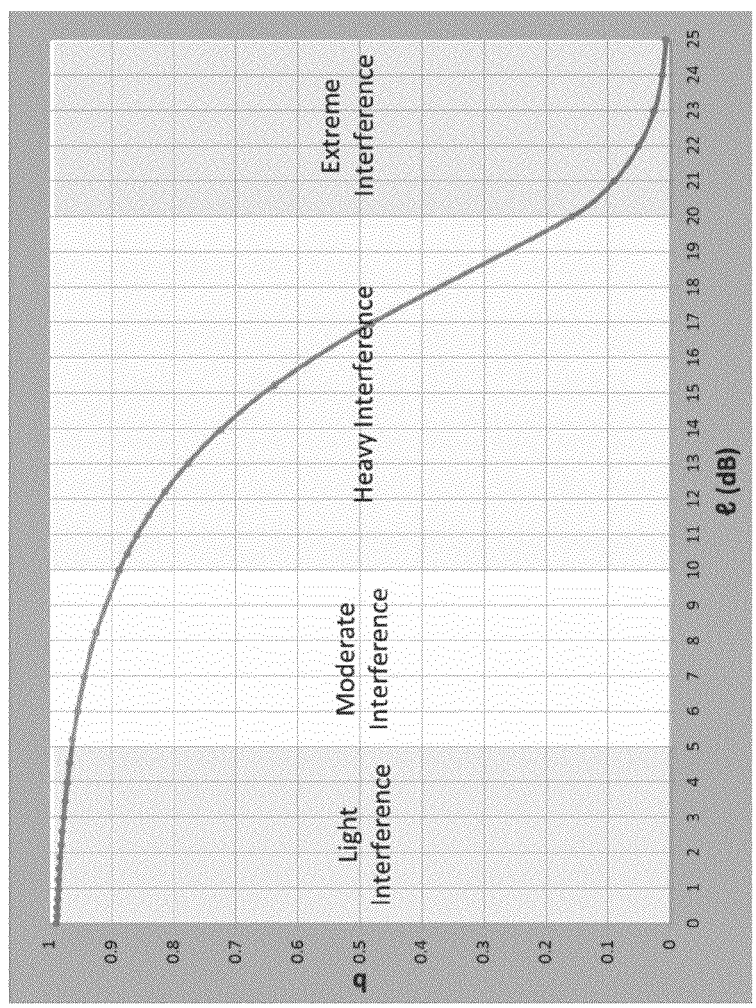
FIG. 7 illustrates a graph used to normalize IoT measurements into a benefit function according to an example embodiment.

In more detail, for each user UE 300, $l_{m,t,u,s}$ may be converted into a benefit quantity $b_{m,t,u,s}$ using a curve-function. For instance, $l_{m,t,u,s}$ may be converted using the curve-function shown in FIG. 7. A curve with a steeper roll-off can be used for a conservative system level IoT operating point and vice versa. In general, any curve can be used. However, the curve should produce the highest benefit (i.e. lower cost) value $b_{m,t,u,s} = f(l_{m,t,u,s})$ to the user u having the lowest $l_{m,t,u,s}$ value for the PRB m.

In step S153, the serving cell 100 may determine an enhanced priority ratio for each UE 300 to make interference-aware PRB scheduling decisions using the following formula:

$$\text{Priority Ratio} = b_{m,t,u,s} \cdot r_{m,t,u,s} / (\tilde{R}_{t,u,s})^\alpha \quad (17)$$

As discussed in step S160 of FIG. 4, the serving cell 100 may assign one of the UEs 300 to the PRB at time t based on the enhanced priority ratio, as determined in step S153. For example, the serving cell 100 may assign the UE 300 having the highest enhanced priority ratio for the PRB at time t among all the UEs 300 within the serving cell 100. In the event there is a plurality of UEs having a same highest enhanced priority ratio for the PRB at time t, then the serving cell 100 may randomly select one or more UEs 300 having the highest enhanced priority ratio for the PRB at time t.

By assigning a UE 300 to the PRB at time t based on the enhanced priority ratio, the interference limiting scheduler may assign the PRB to the UE 300 that would produce the least interference in the system while making sure that long-term PRB resource utilizations among the UEs 300 remain a-fair.

As discussed above, FIGS. 4-6 have been described with respect to serving cell 100, however neighbor cells 200 may perform similar operations with respect to scheduling PRBs to UEs 300 located within their respective cells. Further, while the example embodiments discuss scheduling decisions based on measurements of IoT, the scheduling decisions may be performed based on any measurement of interference and is not limited to scheduling based on measurements of IoT.

While example embodiments have been particularly shown and described, it will be understood by one of ordinary skill in the art that variations in form and detail may be made therein without departing from the spirit and scope of the claims.

I claim:

1. A method of scheduling a physical resource block (PRB) for serving one of a plurality of user equipments (UEs), the method comprising:
   measuring interference on the PRB at a serving cell, the serving cell configured to serve the plurality of UEs;
   receiving measurements of interference on the PRB from neighbor cells of the serving cell;
   estimating a contribution from each UE of the plurality of UEs to each of the neighbor-cell interference measurements;
   determining, for each UE of the plurality of UEs, a respective enhanced priority ratio as a function of the interference measurement at the serving cell, the interference measurements received from the neighbor cells and the respective estimated contribution of the UE; and
   assigning the PRB to one of the plurality of UEs based on the determined enhanced priority ratios.

2. The method of claim 1, further comprising:
   transmitting the interference measurement at the serving cell to the neighbor cells.

3. The method of claim 1, wherein the interference measurements received from the neighbor cells are a time averaged measurement of interference on the PRB at the neighbor cells.

4. The method of claim 1, further comprising:
receiving, at the serving cell, transmit power and noise floor measurements from the neighbor cells; and
receiving, at the serving cell, received power measurements from the plurality of UEs, wherein
estimating the contribution of each of the plurality of UEs is performed using the transmit power and noise floor measurements from the neighbor cells and the respective received power measurements from the UE.

5. The method of claim 4, wherein, for each UE of the plurality of UEs, the received power measurements include a power measurement of a signal received from the serving cell and power measurements of signals received from the neighbor cells.

6. The method of claim 5, further comprising:
determining a target signal to interference plus noise ratio (SINR);
determining, for each UE of the plurality of UEs, a respective serving pathloss between the serving cell and the respective UE;
determining, for each UE of the plurality of UEs, neighbor pathlosses between respective UE and each of the neighbor cells;
determining, for each UE of the plurality of UEs, pathloss differences between the respective determined serving pathloss and each of the respective determined neighbor pathlosses; and
estimating the contribution from each UE of the plurality of UEs to the neighbor-cell interference measurements using the respective determined pathloss differences for the UE, the received noise floor measurements and the determined target SINR.

7. The method of claim 1, wherein the interference measurement at the serving cell and the interference measurements from the neighbor cells are measurements of interference over thermal noise (IoT) on the PRB.

8. A serving cell configured to serve a plurality of user equipments (UEs), the serving cell comprising:
a detector configured to measure interference on a physical resource block (PRB) at the serving cell;
a receiver configured to receive measurements of interference on the PRB from neighbor cells of the serving cell; and
a processor configured to,
estimate a contribution from each UE of the plurality of UEs to each of the interference measurements received from the neighbor cells,
determine for each UE of the plurality of UEs a respective enhanced priority ratio as a function of the interference measurement at the serving cell, the interference measurements received from the neighbor cells and the respective estimated contribution of the UE, and
assign the PRB to one of the plurality of UEs based on the determined enhanced priority ratios.

9. The serving cell of claim 8, further comprising:
a transmitter configured to transmit the interference measurement at the serving cell to the neighbor cells.

10. The serving cell of claim 8, wherein the interference measurements received from the neighbor cells are a time averaged measurement of interference on the PRB at the neighbor cells.

11. The serving cell of claim 8, wherein
the receiver is further configured to,
receive transmit power and noise floor measurements from the neighbor cells; and
receive received power measurements from the plurality of UEs, and
the processor is further configured to estimate the estimated contributions using the transmit power and noise floor measurements from the neighbor cells and the respective received power measurements from the UE.

12. The serving cell of claim 11, wherein, for each UE of the plurality of UEs, the received power measurements include a power measurement of a signal received from the serving cell and power measurements of signals received from the neighbor cells.

13. The serving cell of claim 8, wherein the interference measurement at the serving cell and the interference measurements received from the neighbor cells are measurements of interference over thermal noise (IoT) on the PRB.

14. A wireless cellular network comprising:
a serving cell and neighbor cells of the serving cell, the neighbor cells configured to provide, to the serving cell, a measurement of interference on a physical resource block (PRB),
the serving cell configured to serve a plurality of user equipments (UEs), the serving cell including,
a detector configured to measure the interference on the PRB at the serving cell, and
a processor configured to,
estimate a contribution from each UE of the plurality of UEs to each of the neighbor-cell interference measurements;
determine for each UE of the plurality of UEs a respective enhanced priority ratio as a function of the interference measurement at the serving cell, the interference measurements received from the neighbor cells and the respective estimated contribution of the UE; and
assign the PRB to one of the plurality of UEs based on the determined enhanced priority ratios.

15. The wireless cellular network of claim 14, wherein the serving cell further includes,
a transmitter configured to transmit the interference measurement at the serving cell to the neighbor cells.

16. The wireless cellular network of claim 14, wherein the interference measurements received from the neighbor cells are a time averaged measurement of interference on the PRB at the neighbor cells.

17. The wireless cellular network of claim 14, wherein the serving cell further includes,
a receiver configured to,
receive transmit power and noise floor measurements from the neighbor cells; and
receive received power measurements from the plurality of UEs, and
the processor is further configured to estimate the estimated contributions of each of the plurality of UEs using the transmit power and noise floor measurements from the neighbor cells and the respective received power measurements from the UE.

18. The wireless cellular network of claim 17, wherein, for each UE of the plurality of UEs, the received power measurements include a power measurement of a signal received from the serving cell and power measurements of signals received from the neighbor cells.

19. The wireless cellular network of claim 18, wherein the processor is further configured to,
determine a target signal to interference plus noise ratio (SINR);

determine, for each UE of the plurality of UEs, a respective serving pathloss between the serving cell and the respective UE;

determine, for each UE of the plurality of UEs, neighbor pathlosses between respective UE and each of the neighbor cells;

determine, for each UE of the plurality of UEs, pathloss differences between the respective determined serving pathloss and each of the respective determined neighbor pathlosses; and estimate the contribution from each UE of the plurality of UEs to the neighbor-cell interference measurements using the respective determined pathloss differences for the UE, the received noise floor measurements and the determined target SINR.

20. The wireless cellular network of claim 14, wherein the interference measurement at the serving cell and the interference measurements received from the neighbor cells are measurements of interference over thermal noise (IoT) on the PRB.

* * * * *